US011566893B2

(12) United States Patent
Williams et al.

(10) Patent No.: US 11,566,893 B2
(45) Date of Patent: Jan. 31, 2023

(54) SYSTEMS AND METHODS FOR GENERATING VERTICAL POSITIONING INFORMATION FOR UNMANNED AERIAL VEHICLES

(71) Applicant: Verizon Patent and Licensing Inc., Basking Ridge, NJ (US)

(72) Inventors: Shane Pierce Williams, Monument, CO (US); Eric T. Ringer, Portland, OR (US); Jared Nelson Muirhead, Portland, OR (US); Dana Maher, Portland, OR (US); Matthew Fanelli, Washington, DC (US); Michael David Bergeron, Amsterdam (NL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 373 days.

(21) Appl. No.: 16/856,598

(22) Filed: Apr. 23, 2020

(65) Prior Publication Data
US 2021/0333100 A1    Oct. 28, 2021

(51) Int. Cl.
*G01C 5/06*   (2006.01)
*G01W 1/02*   (2006.01)
*H04L 67/12*  (2022.01)
*B64C 39/02*  (2006.01)

(52) U.S. Cl.
CPC .............. *G01C 5/06* (2013.01); *B64C 39/024* (2013.01); *G01W 1/02* (2013.01); *H04L 67/12* (2013.01); *B64C 2201/12* (2013.01)

(58) Field of Classification Search
CPC ........ G01C 5/06; G01C 21/20; B64C 39/024; B64C 2201/12; B64C 2201/14; G01W 1/02; H04L 67/12; H04W 4/024; H04W 4/44; H04W 4/025; B64D 43/00
See application file for complete search history.

(56) References Cited

U.S. PATENT DOCUMENTS

| 2002/0072832 A1* | 6/2002 | Bachinski ............... G01C 5/005 701/4 |
| 2016/0293019 A1* | 10/2016 | Kim .................... G05D 1/0291 |
| 2021/0241635 A1* | 8/2021 | Tribou ................. G08G 5/0069 |
| 2021/0264799 A1* | 8/2021 | Belt ......................... B64C 1/40 |

* cited by examiner

*Primary Examiner* — Marthe Y Marc-Coleman (57) ABSTRACT

An unmanned aerial vehicle (UAV) may include a communication interface and a pressure sensor configured to measure barometric pressure. The UAV may also include a processor configured to generate a request for elevation data and barometric pressure data and transmit, via the communication interface, the request to the at least one other device. The processor may also be configured to receive, from each of the at least one other device, elevation data and barometric pressure data, and estimate the elevation of the UAV based on the measured barometric pressure, the received elevation data and the received barometric pressure data.

20 Claims, 6 Drawing Sheets

SYSTEMS AND METHODS FOR GENERATING VERTICAL POSITIONING INFORMATION FOR UNMANNED AERIAL VEHICLES

BACKGROUND INFORMATION

The use of Unmanned Aerial Vehicles (UAVs), also referred to as drones, is increasing. In order to fly multiple drones in proximity to one another, each drone must maintain a certain separation from all the other drones. As a result, the positional accuracy with respect to the location of each drone is very important to allow multiple drones to fly in a crowded air space.

DETAILED DESCRIPTION OF PREFERRED EMBODIMENTS

The following detailed description refers to the accompanying drawings. The same reference numbers in different drawings may identify the same or similar elements.

Precise absolute altitude information is important to allow drones to navigate in air spaces that include multiple possible conflict sources—for example, land-based structures such as buildings, transportation infrastructure and utilities infrastructure, as well as airborne conflicts such as other drones. Some conventional drones use Global Positioning System (GPS) units that provide location information, including vertical positioning information (e.g., elevation above sea level). GPS units, however, cannot provide a level of accuracy that is required in many air spaces. For example, even when using wide area augmentation system (WAAS) correction, many standard GPS units provide a vertical dilution of precision (DOP) that may be greater than 10 meters. In addition, since many GPS units use the World Geodetic System (WGS) 84 theoretical ellipsoid to approximate mean sea level, errors in elevation relative to the actual surface of the earth of up to 30 meters may be introduced. As a result, the elevation accuracy associated with existing drones may be inadequate for flying in congested air space, where higher precision absolute altitude information is necessary to avoid air space conflicts.

Implementations described herein provide accurate absolute vertical positioning information for UAVs (also referred to herein as drones) using systems and methods that include using barometric pressure data associated with one or more reference locations having known elevations. In one implementation, a barometer located on a drone may determine the barometric pressure at the drone prior to the flight. The drone may also communicate with one or more fixed devices, such as wireless communication stations, having known elevations to obtain the barometric pressure and elevation data at the fixed devices. For example, the fixed devices may have elevations that have been surveyed and verified as accurate within a small degree of error, such as 0.05 meters or less. The drone may then execute an algorithm, such as a regression algorithm, based on the elevation and barometric pressure data received from the fixed device(s) and the measured barometric pressure at the drone to determine an accurate elevation at the drone prior to the flight. In this manner, the drone uses the elevation and barometric pressure obtained from the fixed device(s) as a benchmark and determines or corrects the drone's conventionally generated elevation information. This may allow drones to have more accurate elevation data and to fly in densely populated air spaces, while also helping to avoid mid-air collisions. In some implementations, the drone may repeat this benchmarking process periodically during flight to ensure positional accuracy, and/or may make adjustments due to changing conditions (e.g., weather).

Figure 1:
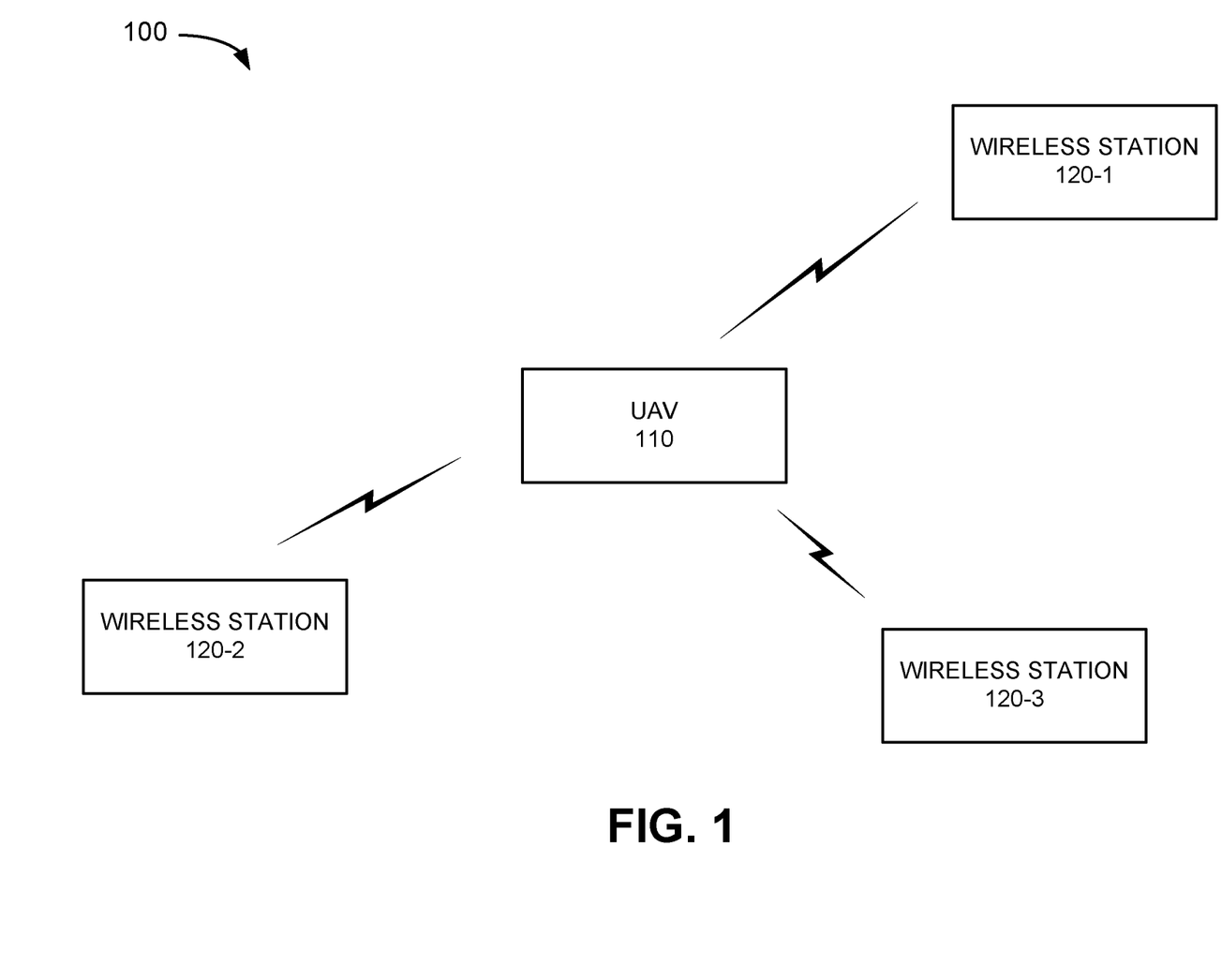
FIG. 1 illustrates an exemplary environment in which systems and methods described herein may be implemented.

FIG. 1 is a diagram illustrating an exemplary environment in which systems and methods described herein may be implemented. Referring to FIG. 1, environment 100 includes UAV 110 (also referred to herein as drone 110), and wireless stations 120-1, 120-2 and 120-3 (referred to individually as wireless station 120 and collectively as wireless stations 120). It should be understood that environment 100 may include a large number of UAVs 110 (e.g., dozens or more) and additional wireless stations 120.

UAV 110 may include an aircraft (e.g., a single rotor aircraft, multirotor aircraft or fixed wing aircraft) that that receives control signals from a controller (not shown). In implementations described herein, UAV 110 may receive signals from a transmitter associated with the controller to control the flight of UAV 110. For example, the rotational speed of each rotor for a multirotor UAV 110 may be adjusted individually via signals from the controller to maneuver UAV 110 based on the particular flight goals.

Wireless stations 120-1, 120-2 and 120-3 (referred to herein collectively as wireless stations 120 and individually as wireless station 120) may be associated with a communication network, such as a fourth generation (4G) long term evolution (LTE) network, a fifth generation (5G) network, etc. Each wireless station 120 may service a set of user equipment (UE) devices (not shown) that may include UAV 110. For example, wireless stations 120 may be part of a radio access network (RAN) that couples UE devices to a core network to receive telephone, data and multi-media data.

In one implementation, wireless station 120 may include a 5G base station (e.g., a next generation NodeB (gNB)) that includes one or more radio frequency (RF) transceivers. For example, wireless station 120 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. The antenna elements may be digitally controllable to electronically tilt or adjust the orientation of an antenna beam in a vertical direction and/or horizontal direction. In some implementations, wireless station 120 may also include a 4G base station (e.g., an evolved NodeB (eNodeB)) that communicates wirelessly with UE devices located within the service range of wireless station 120.

In accordance with an exemplary implementation, each wireless station 120 may have a known elevation, such as an elevation above sea level. The known elevation may be obtained via conventional surveying or any other conventional method in which the accuracy of the elevation is within, for example, 0.05 meters (m). Wireless stations 120 may each also include a barometer to measure the barometric pressure. Wireless stations 120 may provide the elevation and barometric pressure data to UAV 110 to allow UAV 110 to accurately determine its elevation, as described in detail below.

Figure 2:
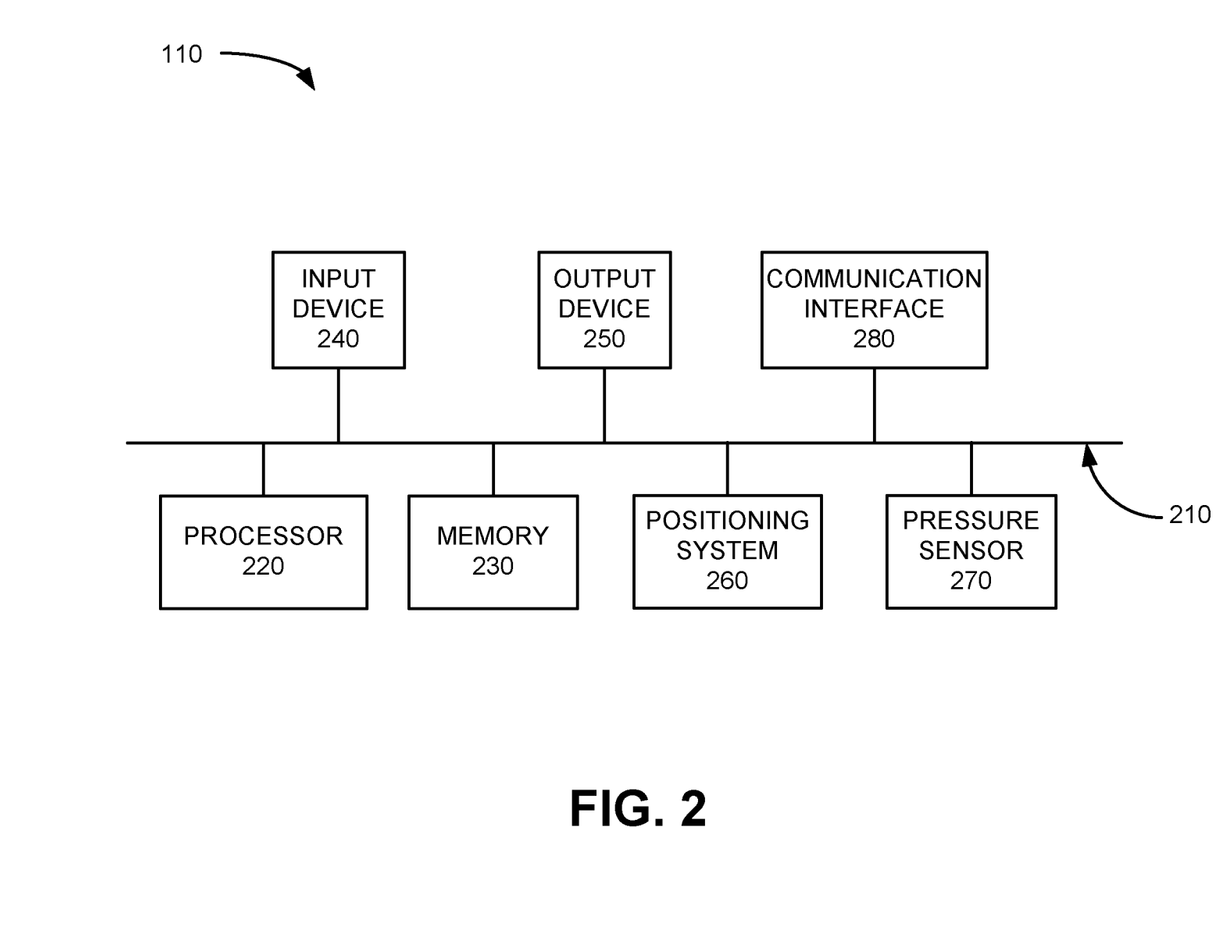
FIG. 2 is a block diagram of components implemented in the UAV of FIG. 1 in accordance with an exemplary implementation.

FIG. 2 illustrates an exemplary configuration of UAV 110. Referring to FIG. 2, UAV 110 may include bus 210, processor 220, memory 230, input device 240, output device 250, positioning system 260, pressure sensor 270 and communication interface 280. Bus 210 may include a path that permits communication among the elements of UAV 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, UAV 110 may include a touch screen display may act as both an input device 240 and an output device 250.

Positioning system 260 may include one or more receivers, sensors, and/or processors to provide relative and/or absolute position and orientation data of UAV 110. For example, positioning system 260 may include a satellite navigation system, such as a global positioning system (GPS) component, which may provide position information in relation to a standard reference frame. Position information may include rectangular coordinates in the World Geodetic System 84 (WGS84) frame (in either two or three dimensions), geodic coordinates such as latitude, longitude, and altitude, and/or other suitable positioning data. In another embodiment, positioning system 260 may include an internal measurement unit (IMU) to determine relative displacements based on measured accelerations, and/or gyroscopes to measure angular displacements such as the roll, pitch, and yaw of UAV 110. Positioning system 260 may further include sensors, such as magnetometers, which may be used to determine orientation in a reference frame, such as, for example, the angular orientations with respect to magnetic and/or true north.

Pressure sensor 270 may measure barometric pressure. For example, pressure sensor 270 may include a barometer to measure barometric pressure when UAV 110 is powered up. Pressure sensor 270 may also measure the barometric pressure at predetermined intervals or continuously. The barometric pressure data may be used to determine the elevation of UAV 110 while UAV 110 is in flight.

Communication interface 280 may include one or more transceivers that UAV 110 uses to communicate with other devices via wired, wireless or optical mechanisms. For example, communication interface 280 may include one or more radio frequency (RF) transmitters, receivers and/or transceivers and one or more antennas for transmitting and receiving RF data. Communication interface 280 may also include a modem or an Ethernet interface to a LAN or other mechanisms for communicating with elements in a network.

The exemplary configuration illustrated in FIG. 2 is provided for simplicity. It should be understood that UAV 110 may include more or fewer devices than illustrated in FIG. 2. For example, UAV 110 may include one or more rotors, sensors and control circuitry to control and/or monitor the flight of UAV 110, as well as a battery to power UAV 110. In an exemplary implementation, UAV 110 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 280. Alternatively, hard-wired circuitry may be used in place of or in combination with software instructions to implement processes consistent with the implementations described herein. Thus, implementations described herein are not limited to any specific combination of hardware circuitry and software.

Figure 3:
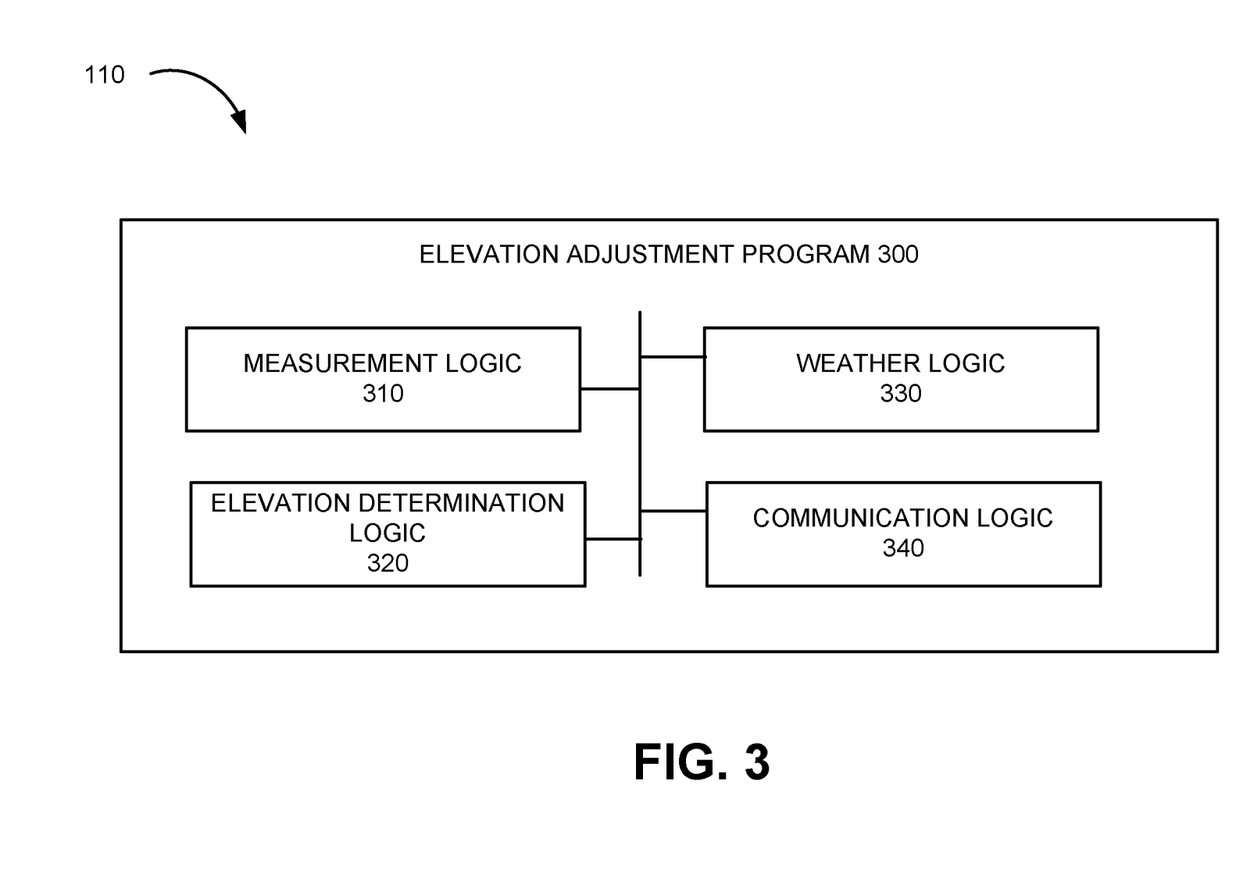
FIG. 3 illustrates exemplary logic components implemented in the UAV of FIG. 1 in accordance with an exemplary implementation.

FIG. 3 is an exemplary functional block diagram of components implemented in UAV 110 of FIG. 1. Referring to FIG. 3, elevation adjustment program 300 may be an application program associated with determining and/or correcting the estimated elevation of UAV 110 prior to and/or during a flight. Elevation adjustment program 300 may include software instructions executed by processor 220 stored in memory 230 of UAV 110. In alternative implementations, these components or a portion of these components may be located externally with respect to UAV 110.

Elevation adjustment program 300 may include measurement logic 310, elevation determination logic 320, weather logic 330 and communication logic 340. Measurement logic 310 may include logic to obtain information associated with an initial elevation of UAV 110. For example, measurement logic 310 may access pressure sensor 270 to determine a current barometric pressure at the location of UAV 110. Measurement logic 310 may also access positioning system 260 to determine an estimated location of UAV 110, including information corresponding to an estimated elevation above sea level. As discussed previously, positioning system 260 may include a GPS system/unit that is used to estimate the location of UAV 110, including the elevation above sea level.

Elevation determination logic 320 may include logic to determine or calibrate the initial elevation of UAV 110 prior to a flight. For example, elevation determination logic 320 may generate a communication requesting barometric pressure data and elevation data from fixed devices having known (e.g., surveyed) elevations, such as wireless stations 120. Elevation determination logic 320 may transmit such communications to the fixed devices prior to a flight, as described in detail below.

Elevation determination logic 320 may also include logic that uses the received barometric pressure and elevation data from other devices, such as wireless stations 120, and determines the elevation of UAV 110 based on the received data. For example, elevation determination logic 320 may compare the received barometric pressure and elevation data with the barometric pressure and elevation data measured by UAV 110. Elevation determination logic 320 may then set the initial elevation of UAV 110 or adjust the initial elevation determined by UAV 110 (e.g., by positioning system 260) based on the comparison. For example, in one implementation, elevation determination logic 320 may execute a linear regression algorithm using the data pairs (e.g., barometric pressure and elevation data from wireless stations 120) and determine the elevation of UAV 110 based on the measured barometric pressure data at UAV 110 and the linear regression analysis, as described in more detail below.

Weather logic 330 may analyze barometric pressure data from pressure sensor 270 and determine whether a change in weather (a weather pattern, such as a cold front or storm), is occurring in an area in which UAV 110 is flying or planning to fly. In such a case, weather logic 330 may sense such a change based on a rapid change in barometric pressure measured by pressure sensor 270. Weather logic 330 may then determine that elevation determination logic 320 may need to adjust the determining of the elevation of the UAV 110 based on the newly arriving weather pattern, as described in detail below.

Communication logic 340 may include logic for communicating with other devices in environment 100. For example, communication logic 340 may forward messages to wireless stations 120 located within a wireless range of UAV 110. The messages may request barometric pressure and elevation data. Communication logic 340 may also receive communications from wireless stations 120 in response to the requests and forward the communications to, for example, elevation determination logic 320.

Although FIG. 3 shows exemplary components of elevation adjustment program 300, in other implementations, elevation adjustment program 300 may include fewer components, different components, differently arranged components, or additional components than depicted in FIG. 3.

Figure 4:
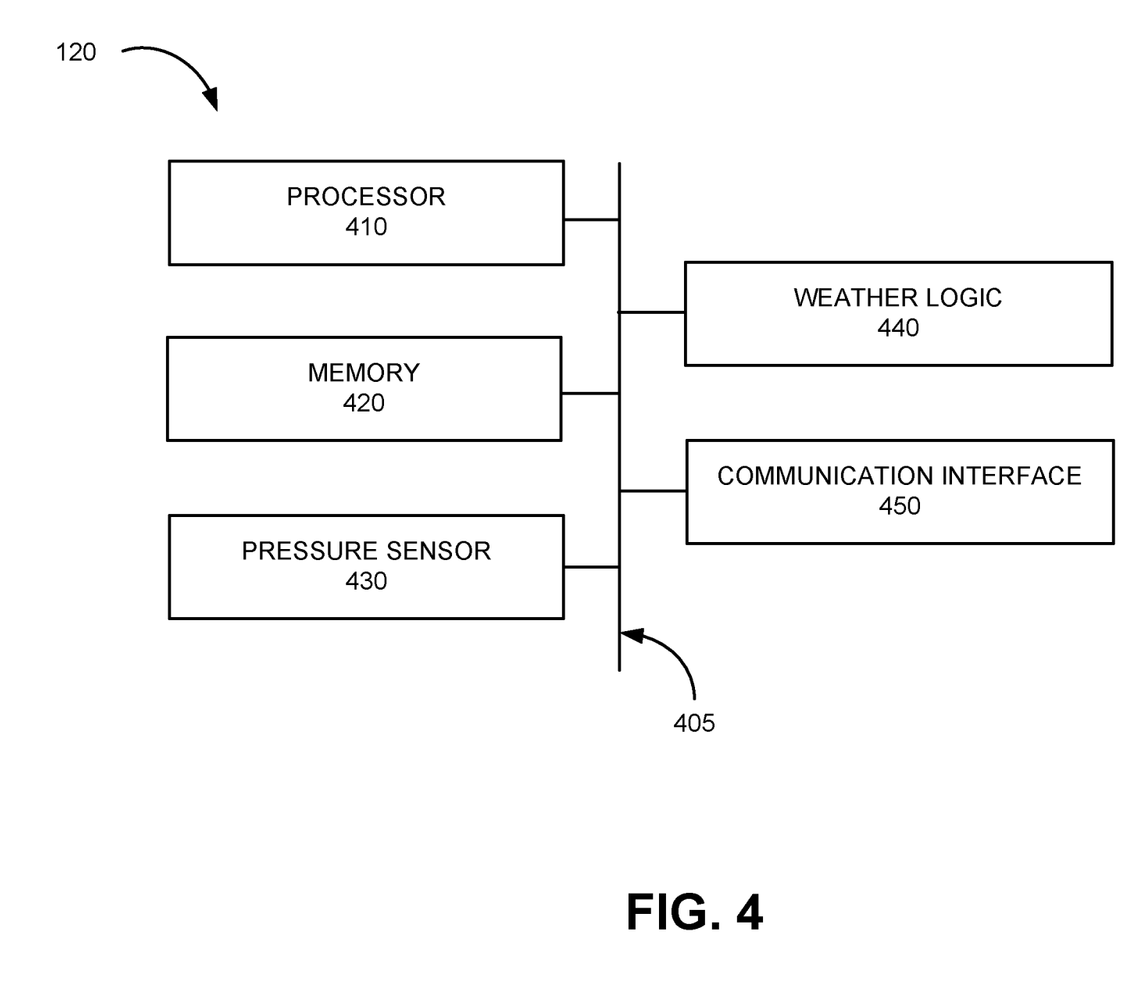
FIG. 4 is a block diagram illustrating components implemented in the wireless stations of FIG. 1 in accordance with an exemplary implementation.

FIG. 4 illustrates an exemplary configuration of wireless station 120. Referring to FIG. 4, wireless station 120 includes processor 410, memory 420, pressure sensor 430, weather logic 440 and communication interface 450. Bus 405 may include a path that permits communication among the elements of wireless station 120.

Processor 410 may include one or more processors, microprocessors, or processing logic that may interpret and execute instructions. Memory 420 may include a random access memory (RAM) or another type of dynamic storage device that may store information and instructions for execution by processor 410. Memory 420 may also include a ROM device or another type of static storage device that may store static information and instructions for use by processor 410. Memory 420 may further include an SSD. Memory 420 may also include a magnetic and/or optical recording medium (e.g., a hard disk) and its corresponding drive.

Pressure sensor 430 may measure barometric pressure. For example, pressure sensor 430 may include a barometer to measure barometric pressure at wireless station 120. Pressure sensor 430 may also measure the barometric pressure at predetermined intervals or continuously. The barometric pressure may be forwarded to UAV 110 to aid in determine the elevation of UAV 110, as described in detail below.

Weather logic 440 may analyze barometric pressure data from pressure sensor 430 and determine whether a change in weather (e.g., a weather pattern, such as a cold front or storm), is occurring in an area in which wireless station 120 is located. In such a case, weather logic 440 may sense such a change based on a rapid change in barometric pressure. Weather logic 440 may then determine that current barometric pressure readings to be provided to UAV 110 should be adjusted (for example, delayed for a period of time, such as until the barometric pressure has stabilized).

Communication interface 450 may include one or more transceivers that wireless station 120 uses to communicate with other devices via wired, wireless or optical mechanisms. For example, communication interface 450 may include one or more RF transmitters, receivers and/or transceivers and one or more antennas for transmitting and receiving RF data. Communication interface 450 may also include a modem or an Ethernet interface to a LAN or other mechanisms for communicating with elements in a network.

The exemplary configuration illustrated in FIG. 4 is provided for simplicity. It should be understood that wireless station 120 may include more or fewer devices than illustrated in FIG. 4. For example, wireless station 120 may include additional components associated with receiving and forwarding communications to/from UE devices for a wireless service provider. In an exemplary implementation, wireless station 120 performs operations in response to processor 410 executing sequences of instructions contained in a computer-readable medium, such as memory 420. A computer-readable medium may be defined as a physical or logical memory device. The software instructions may be read into memory 420 from another computer-readable medium (e.g., a hard disk drive (HDD), SSD, etc.), or from another device via communication interface 450.

Alternatively, hard-wired circuitry may be used in place of or in combination with software instructions to implement processes consistent with the implementations described herein. Thus, implementations described herein are not limited to any specific combination of hardware circuitry and software.

Figure 5:
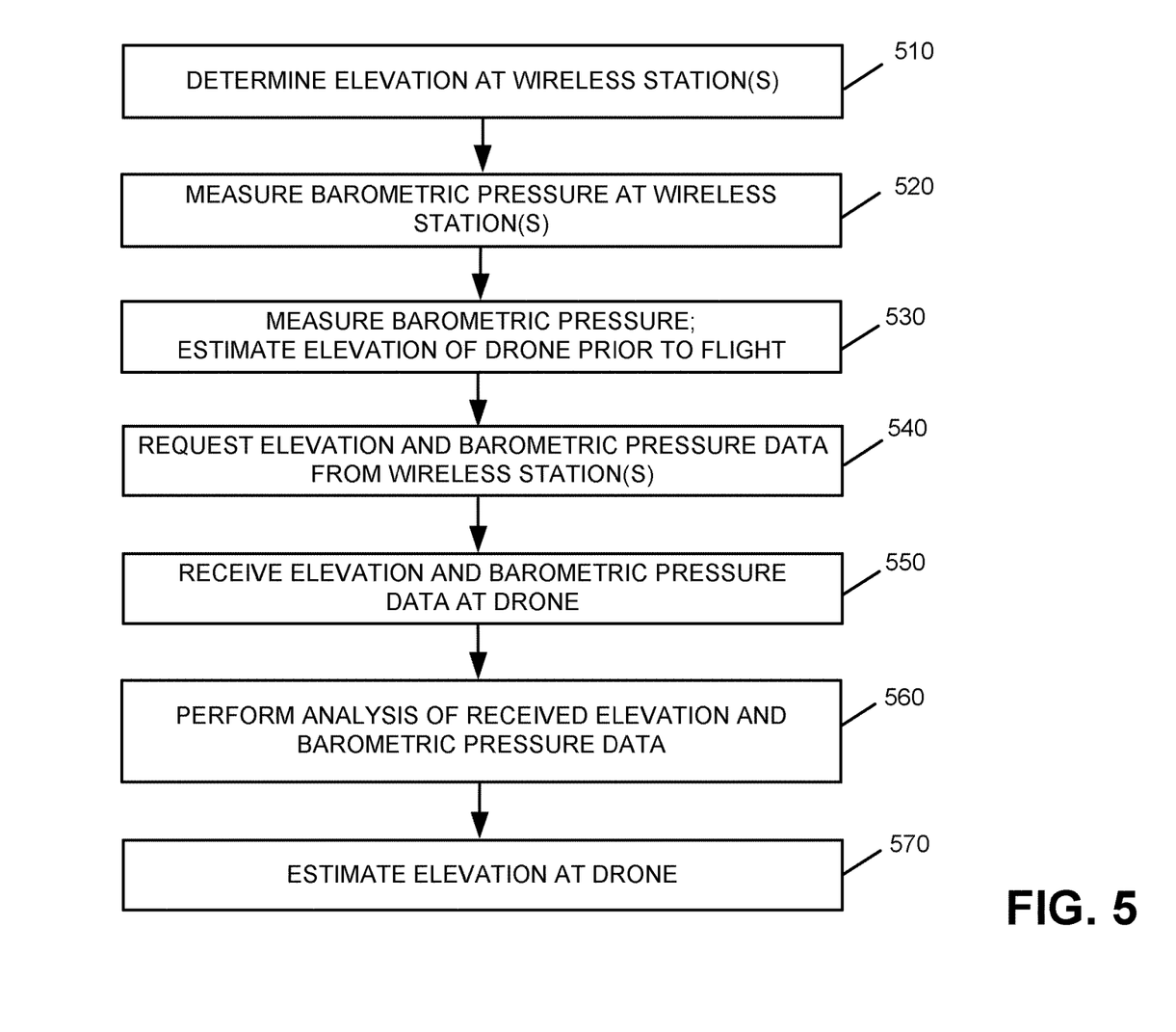
FIG. 5 is a flow diagram illustrating processing associated with determining the elevation of the UAV of FIG. 1 in accordance with an exemplary implementation.

FIG. 5 is a flow diagram illustrating processing associated with elements of environment 100 to determine an elevation of UAV 110 in accordance with an exemplary implementation. The flow diagram of FIG. 5 is described in conjunction with the signal flow diagram of FIG. 6. Processing may begin with determining the elevation of wireless stations 120 (block 510). For example, the elevation of each wireless station 120 may be determined using conventional surveying equipment that uses the elevation of known reference points to determine the elevation of wireless station 120. The elevation of each wireless station 120 may be determined within a degree of accuracy of, for example, 0.05 meters or less. The elevation of each wireless station 120 may be stored in its respective memory 420 along with a timestamp indicating the time when the barometric pressure was recorded.

Wireless station 120 may then determine the barometric pressure via pressure sensor 430 (block 520). For example, every predetermined period of time (e.g., 10 seconds, 1 minute, 10 minutes, 1 hour, etc.), processor 410 at wireless station 120 may poll/access pressure sensor 430 to determine the current barometric pressure measured via pressure sensor 430. Processor 410 may store the barometric pressure data in memory 420.

Figure 6:
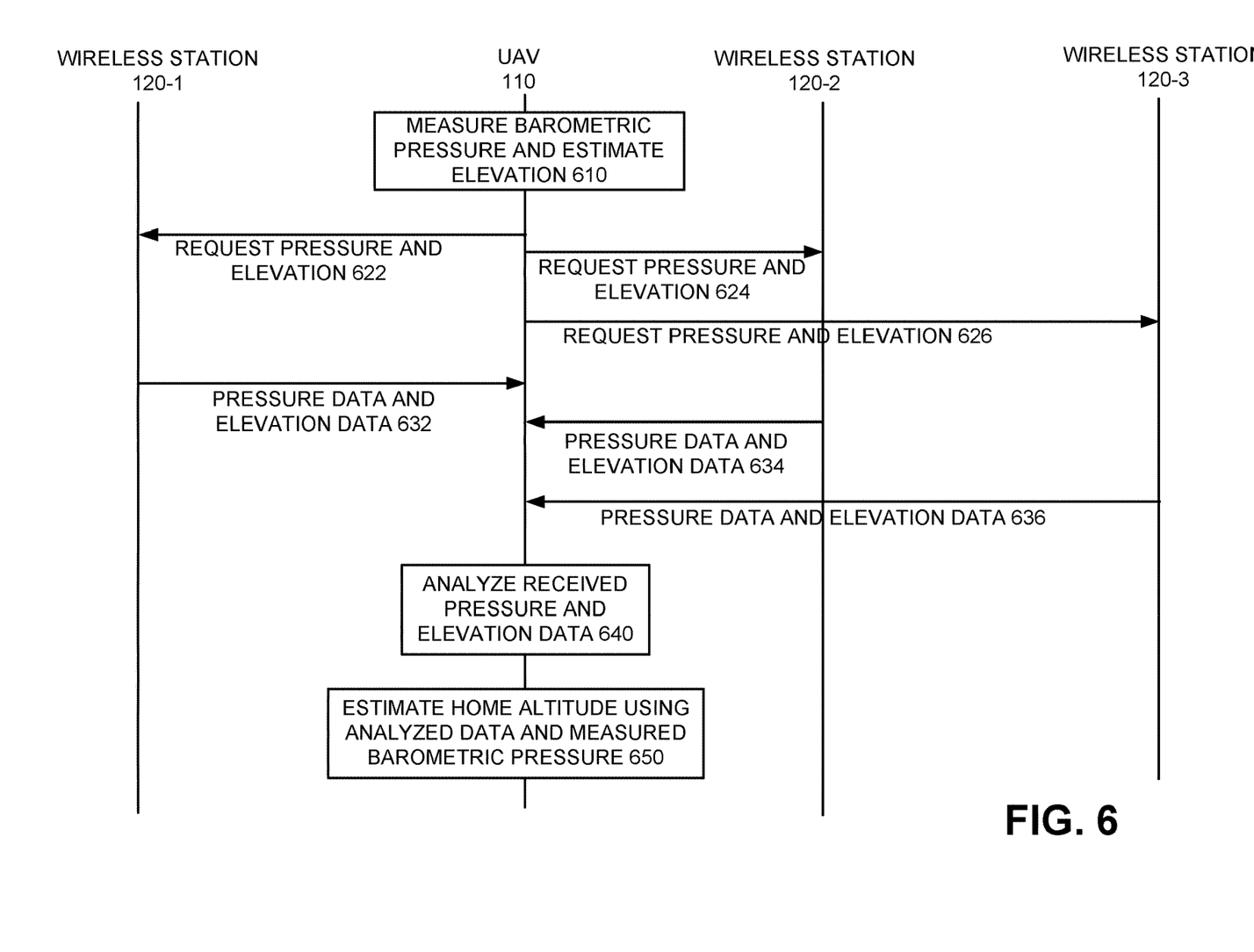
FIG. 6 is an exemplary signal flow diagram associated with the processing of FIG. 5.

Assume that UAV 110 is being prepared for a flight. Elevation adjustment program 300 may start up when UAV 110 is powered up prior to the flight. Elevation adjustment program 300 may then determine the barometric pressure at UAV 110 (block 530; FIG. 6, block 610). For example, measurement logic 310 may access pressure sensor 270 to determine the current barometric pressure at UAV 110. Measurement logic 310 may also estimate the current position information of UAV 110 (e.g., latitude, longitude and elevation) using, for example, positioning system 260 (block 530; FIG. 6, block 610). As discussed previously, positioning system 260 may use GPS or other conventional mechanisms to estimate the elevation.

After determining the barometric pressure and estimating the elevation, elevation adjustment program 300 may generate a request for elevation and barometric pressure data from one or more fixed locations within the range of the transmitter included in UAV 110 (block 540). For example, elevation determination logic 320 may generate messages for transmission to wireless stations 120 within wireless range of UAV 110 requesting both elevation and barometric pressure data at the wireless stations 120. Communication logic 340 may transmit the messages to the appropriate wireless stations 120, such as wireless stations 120-1, 120-2 and 120-3 (FIG. 6, signals 622, 624 and 626).

Wireless stations 120 receive the communications from UAV 110 and forward their respective elevation and barometric pressure data to UAV 110. For example, assume that wireless stations 120-1, 120-2 and 120-3 receive the request messages from UAV 110. Processor 410 at each wireless station 120 may access its respective memory 420 to retrieve the elevation and current barometric pressure data. Processor 410 may then generate a message including the barometric pressure and elevation data, and transmit the message via communication interface 450 to UAV 110 (FIG. 6, signals 632, 634 and 636). In some implementations, wireless stations 120 may transmit the barometric pressure and elevation data to UAV 110 along with other signaling that may be sent to UAV 110, such as signals associated with a service provider associated with wireless stations 120 providing wireless services to UAV 110. Sending the barometric pressure and elevation data with other signals may help reduce signaling traffic in environment 100. In some implementations, location information (e.g., x-y location) may also be provided with the elevation and barometric pressure data, such as a location of the wireless station 120 and/or a distance between the wireless station 120 and the UAV 110. In each case, communication interface 280 at UAV 110 receives the messages from wireless stations 120 and forwards the messages to elevation adjustment program 300 (block 550).

Elevation adjustment program 300 receives the messages with the elevation and barometric pressure data. Elevation adjustment program 300 may then analyze the data and estimate the elevation of UAV 110 based on the received data (blocks 560 and 570). For example, in one implementation, elevation determination logic 320 may use the elevation and barometric pressure data from wireless stations 120-1, 120-2 and 120-3 and perform a linear regression analysis using the received data pairs (i.e., elevation and barometric pressure data) (FIG. 6, 640). In one implementation, elevation determination logic 320 may execute a least squares fit algorithm using the received barometric pressure data and elevation data to generate a best fit line for barometric pressure versus elevation. In some implementations, the locations of the wireless stations 120 may be taken into account in calculating elevations, such that the information provided by wireless stations 120 located closer to the current position of UAV 110 are weighted higher than those farther away. Elevation determination logic 320 may then determine the elevation at UAV 110 using the best fit line and based on the measured barometric pressure at UAV 110 (FIG. 6, 650).

For example, assume that the measured barometric pressure at wireless station 120-1 is 77.158 kilopascals (kpa) and the known elevation is 2225 meters, the measured barometric pressure at wireless station 120-2 is 77.172 kpa and the known elevation is 2241 meters, and the measured barometric pressure at wireless station 120-3 is 77.181 kpa and the known elevation is 2215 meters. Further assume that the measured barometric pressure at UAV 110 is 77.203 kpa. Using the received barometric pressure and elevation data pairs from wireless stations 120-1, 120-2 and 120-3, elevation determination logic 320 may execute a regression algorithm, such as a least squares fit algorithm and generate a best fit line representing barometric pressure versus elevation. Elevation determination logic 320 may use the measured barometric pressure and the calculated best fit line and determine the elevation corresponding to the measured barometric pressure of 77.203 kpa at UAV 110. In this example, assume that the measured barometric pressure of 77.203 kpa corresponds to an elevation of 2202 meters based on the least squares fit line generated by elevation determination logic 320. In this manner, using the known elevations of wireless stations 120, the elevation of UAV 110 may be determined within an accuracy of 1.0 meters or less (e.g., 0.5 meters or less). This may also allow multiple UAVs 110 having different types of barometers each having differing accuracies to be normalized such that all UAVs 110 flying in an air space may have the same reference elevation accuracy. Such absolute elevation accuracy may aid in avoiding mid-air collisions. In addition, some UAVs 110 that include a vision system that can calibrate to within, for example, 10 centimeters, may then obtain an elevation above sea level accuracy of, for example, less than 25 centimeters.

As described previously, measurement logic 310 may have initially estimated the elevation of UAV 110 using positioning system 260. For example, assume that positioning system 260 indicated that the elevation of UAV 110 prior to the flight is 2195 meters. In this example, elevation determination logic 320 may set the initial or home measurement to 2202 meters and/or adjust the initial elevation estimate of 2195 meters to 2202 meters (i.e., an adjustment of +7.0 meters). UAV 110 may then use the 2202 meter elevation value as a baseline for all future elevation determinations when UAV 110 is in flight. For example, all subsequent elevations generated using pressure sensor 270 while UAV 110 is in flight will be based on the initial or home elevation value of 2202 meters.

As discussed above, in some implementations, UAV 110 may communicate with multiple wireless stations 120 with known elevations. In other implementations, UAV 110 may communicate with a single wireless station 120 having a known elevation. In this case, elevation adjustment program 300 may use the received barometric pressure and elevation data from the single wireless station 120 to determine the elevation at UAV 110. For example, elevation determination logic 320 may determine a difference between the barometric pressure at UAV 110 and the received barometric pressure data from wireless station 120. In one implementation, elevation determination logic 320 may multiply the difference in barometric pressures by a fixed value corresponding to change in elevation based on change in barometric pressure. For example, the fixed value may be an elevation delta or change in meters for every 0.01 kpa change in barometric pressure. Such an elevation value may then be applied to the received elevation from wireless station 120 (e.g., added or subtracted) to estimate the initial elevation of UAV 110 based on data received from only one wireless station 120.

In still another implementation, UAV 110 may store a lookup table in memory 230 correlating elevation in meters to barometric pressure in kpa. In this example, elevation determination logic 320 may determine a difference between the known elevation obtained from one wireless station 120 with the elevation stored in the lookup table for the particular barometric pressure measured at wireless station 120. In this case, elevation determination logic 320 may then determine an adjustment based on the particular information. For example, suppose that the elevation in the lookup table for a barometric pressure of 77.158 kpa corresponds to an elevation above sea level of 2220 meters. Further suppose that the elevation data received from wireless station 120 indicates 2225 meters at a barometric pressure of 77.158 kpa. In this example, elevation determination logic 320 may determine that an adjustment of +5.0 meters will be applied to the initial elevation determination provided by positioning system 260. For example, assume that the pressure sensor 270 measures the barometric pressure at UAV 110 to be 77.203 kpa, and the lookup table provides an elevation of 2195 meters for that barometric pressure. In this case, elevation determination logic 320 may provide an adjustment/correction of +5.0 meters and determine that the initial elevation of UAV 110 is 2200 meters (i.e., 2195 plus 5).

In some implementations, UAV 110 may communicate with one or more wireless stations 120 periodically during the course of a flight, and obtain current barometric pressure and elevation data from the wireless stations 120. If the barometric pressure reported by a wireless station 120 has changed from a prior report, the UAV 110 may adjust its elevation calculations using the new baseline barometric pressure. Periodic updates to baseline barometric pressures may be useful for drone flights over an extended period of time, where the ambient atmospheric conditions may change over time. Periodic updates may also be useful for drone flights over an extended geographic area where multiple wireless stations 120 may come into range of UAV 110 during a flight path (and may be useful to ensure all UAVs in a geographic area are working from the same baseline barometric pressure measurements).

As also discussed above, in some instances, a weather front may be moving into a particular area in which UAV 110 is located. In such instances, the barometric pressure may be changing rapidly due to the incoming weather front. As a result, the barometric pressure at one or more of wireless stations 120 may adversely impact the analysis performed by elevation adjustment program 300. In such cases, elevation adjustment program 300 may wait until the weather front has encompassed the area in which UAV 110 and wireless stations 120 are located so that all of the received data is consistent with the current weather conditions at UAV 110.

For example, if weather logic 330 determines that the barometric pressure at UAV 110 is changing relatively quickly (or the barometric pressure is changing more than a typical range/rate of variations while other UAV sensors are not indicating a change in elevation), weather logic 330 may signal elevation determination logic 320 to wait for a predetermined period of time before determining the elevation of UAV 110. For example, weather logic 330 may wait until the barometric pressure has stabilized (e.g., changing less than a predetermined amount over a period of time, such as one to five minutes or more) before determining the elevation of UAV 110 using the current barometric pressure. Similarly, if any of wireless stations 120 determine that the barometric pressure is changing relatively quickly, those wireless stations 120 may wait for a predetermined period of time or until the barometric pressure has stabilized before responding to the request from UAV 110 for the elevation and barometric pressure data. In this manner, anomalies due to changing weather may not adversely affect the determination of elevation by UAV 110.

Additionally or alternatively, if the weather pattern is changing, UAV 110 may transmit requests to wireless stations 120 for new barometric pressure and elevation data. The new barometric pressure and elevation data may be used to confirm the pressure changes being detected on the UAV 110 and/or update the elevation calculation using the more recent barometric pressure data. Additionally or alternatively, UAV 110 may report the detected weather changes to a UAV operator, which may be useful to confirm flight operations or take emergency actions (e.g., immediate return to ground). In other alternatives, wireless stations 120 may collaborate with each other to determine which wireless stations 120 should transmit the elevation and barometric pressure data to UAV 110 to ensure that the wireless stations 120 sending the barometric pressure data are experiencing the same weather (e.g., the weather front has moved in and the barometric pressure has stabilized). In this implementation, the barometric pressure data from the transmitting wireless stations 120 will be consistent. In still other alternatives, UAV 110 may store multiple tables with different barometric pressure and elevation data pairs based on various weather conditions to allow UAV 110 to determine an elevation of UAV 110 in different types of weather.

Implementations described herein provide accurate vertical positioning information for UAVs using elevation and barometric pressure information from locations having known elevations. The UAV may analyze the data from the locations having the known elevations and set or adjust the UAV's initial or home elevation based on the analysis. This may allow UAVs to have more accurate elevation data while flying and may also allow UAVs to fly in densely populated air spaces, while also aiding in avoiding mid-air collisions. In addition, using elevation data from locations having known elevations to determine the elevation of UAVs may effectively normalize the elevation information across a number UAVs having different barometers with differing accuracies.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to UAV 110 communication with wireless stations 120 to obtain elevation and barometric pressure data. In other implementations, UAV 110 may communicate with any fixed device having a known elevation and the ability to determine barometric pressure. Further, features have been described above with obtaining data from multiple wireless stations (e.g., three) or a single wireless station. In other implementations, UAV 110 may communicate with other numbers of wireless stations, such as two, five, ten, etc., to obtain elevation and barometric pressure data. Obtaining data from a larger number of wireless stations 120 (e.g., three or more) may increase the accuracy of the elevation determination performed by UAV 110.

In addition, elevation adjustment program 300 has been described as performing various types of analysis (e.g., linear regression analysis, using a lookup table, etc.) using elevation data from devices having known elevations. It should be understood that elevation adjustment program 300 may perform other types of analysis for received elevation data and barometric pressure data to set and/or modify the estimated elevation of UAV 110.

Still further, features have been described above with respect to UAV 110 including an elevation adjustment program 300 to determine its elevation. In other implementations, devices external to UAV 110 may determine the elevation. For example, wireless stations 120 and/or devices in a network coupled to wireless stations 120 may receive the elevation data and barometric pressure data from wireless stations 120, as well as the barometric pressure data from UAV 110 and determine the elevation of UAV 110. The device located externally to the UAV 110 may then provide the estimated elevation to UAV 110.

Further, while series of acts have been described with respect to FIG. 5 and signal flows with respect to FIG. 6, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An unmanned aerial vehicle (UAV), comprising:
    a communication interface;
    a pressure sensor configured to measure barometric pressure; and
    a processor configured to:
        generate a request for elevation data and barometric pressure data,
        transmit, via the communication interface and at periodic intervals, the request for elevation data and barometric pressure data to at least one other device,
        receive, from each of the at least one other device, elevation data and barometric pressure data, and
        estimate the elevation of the UAV based on the measured barometric pressure, the received elevation data and the received barometric pressure data.

2. The UAV of claim 1, wherein the at least one other device comprises a fixed device having a known elevation.

3. The UAV of claim 1, wherein the at least one other device comprises a plurality of wireless stations, wherein each of the plurality of wireless stations has a known elevation.

4. The UAV of claim 3, wherein when estimating the elevation, the processor is configured to:
    perform a linear regression analysis based on the received elevation data and the received barometric pressure data, and
    determine the elevation of the UAV based on the linear regression analysis and the measured barometric pressure.

5. The UAV of claim 1, wherein when estimating the elevation, the processor is configured to:
    determine a difference between the measured barometric pressure and the received barometric pressure data,
    multiply the difference by a constant elevation value to obtain an elevation offset, and
    apply the elevation offset to the received elevation data.

6. The UAV of claim 1, further comprising:
    a memory configured to store a table of elevation value and barometric pressure value pairs, wherein when estimating the elevation, the processor is configured to:
    access the memory to identify a first elevation corresponding to the received barometric pressure data,
    determine a difference between the identified first elevation and the received elevation data,
    access the memory to identify a second elevation corresponding to the measured barometric pressure, and
    apply the difference to the identified second elevation to estimate the elevation of the UAV.

7. The UAV of claim 1, wherein the processor is further configured to:
    use the estimated elevation as the elevation of the UAV prior to a flight.

8. The UAV of claim 1, wherein the at least one device comprises a plurality of devices having known elevations, wherein when estimating the elevation, the processor is further configured to:
    determine, based on the received barometric pressure data from the plurality of devices, that a change in weather is occurring in an area in which the UAV is located.

9. The UAV of claim 8, wherein the processor is further configured to:
    delay estimating the elevation of the UAV for a period of time based on determining that the change in weather is occurring.

10. A method, comprising:
    measuring, by an unmanned aerial vehicle (UAV), barometric pressure;
    generating, by the UAV, a request for elevation data and barometric pressure data;
    transmitting the request to at least one other device;
    receiving, from each of the at least one other device, elevation data and barometric pressure data; and
    estimating, by the UAV, the elevation of the UAV based on the measured barometric pressure, the received elevation data and the received barometric pressure data,
    wherein the at least one other device comprises a plurality of wireless stations, and wherein the estimating comprises:

performing a regression analysis based on the received elevation data and the received barometric pressure data, and determining the elevation of the UAV based on the regression analysis and the measured barometric pressure.

11. The method of claim 10, wherein the transmitting comprises:

transmitting the request to the plurality of wireless stations having known elevations.

12. The method of claim 10, wherein the estimating the elevation further comprises:

determining a difference between the measured barometric pressure and the received barometric pressure data, generating an elevation offset based on the difference, and applying the elevation offset to the received elevation data to estimate the elevation of the UAV.

13. The method of claim 10, further comprising:

determining that a change in weather is occurring in an area in which the UAV is located; and delaying the estimating of the elevation of the UAV for a period of time based on determining that the change in weather is occurring.

14. The method of claim 10, wherein the plurality of wireless stations have known elevations.

15. A non-transitory computer-readable medium having stored thereon sequences of instructions which, when executed by at least one processor included in a unmanned aerial vehicle (UAV), cause the at least one processor to:

determine the barometric pressure;

generate a request for elevation data and barometric pressure data;

transmit, via the communication interface and at periodic intervals, the request for elevation data and barometric pressure data to at least one other device;

receive, from each of the at least one other device, elevation data and barometric pressure data; and estimate the elevation of the UAV based on the determined barometric pressure, the received elevation data and the received barometric pressure data.

16. The non-transitory computer-readable medium of claim 15, wherein the instructions further cause the at least one processor to transmit the request to a plurality of devices having known elevations.

17. The non-transitory computer-readable medium of claim 15, wherein when estimating the elevation, the instructions further cause the at least one processor to:

perform a regression analysis based on the received elevation data and the received barometric pressure data, and determine the elevation of the UAV based on the regression analysis and the measured barometric pressure.

18. The non-transitory computer-readable medium of claim 15, wherein the instructions further cause the at least one processor to:

determine that a change in weather is occurring in an area in which the UAV is located; and delay the estimating of the elevation of the UAV for a period of time based on determining that the change in weather is occurring.

19. The non-transitory computer-readable medium of claim 15, wherein when estimating the elevation, the instructions further cause the at least one processor to:

determine a difference between the measured barometric pressure and the received barometric pressure data, generate an elevation offset based on the difference, and apply the elevation offset to the received elevation data to estimate the elevation of the UAV.

20. The non-transitory computer-readable medium of claim 15, wherein when estimating the elevation, the instructions further cause the at least one processor to:

access a memory storing a table of elevation value and barometric pressure value pairs to identify a first elevation corresponding to the received barometric pressure data, determine a difference between the identified first elevation and the received elevation data, access the memory to identify a second elevation corresponding to the measured barometric pressure, and apply the difference to the identified second elevation to estimate the elevation of the UAV.

* * * * *